United States Patent [19]

Minamimura et al.

[11] Patent Number: 5,451,363
[45] Date of Patent: Sep. 19, 1995

[54] INJECTION MOLDING METHOD

[75] Inventors: Masaaki Minamimura; Fumio Shiozawa; Masahiko Miyajima, all of Nagano, Japan

[73] Assignee: Nissei Plastic Industrial Co., Ltd., Japan

[21] Appl. No.: 287,836

[22] Filed: Aug. 9, 1994

[30] Foreign Application Priority Data

Aug. 20, 1993 [JP] Japan .................. 5-226631

[51] Int. Cl.⁶ .............................. B29C 45/56
[52] U.S. Cl. ............. 264/328.7; 264/328.13; 425/589
[58] Field of Search ............ 264/40.1, 40.5, 2.2, 264/328.7, 328.8, 328.13; 425/135, 145, 147, 149, 150, 589

[56] References Cited

U.S. PATENT DOCUMENTS

| | | | |
|---|---|---|---|
| 4,707,321 | 11/1987 | Segawa et al. | 264/328.7 |
| 5,002,706 | 3/1991 | Yamashita | 264/40.5 |
| 5,176,859 | 1/1993 | Leffew | 264/40.5 |
| 5,354,525 | 10/1994 | Fujimoto | 425/145 |

FOREIGN PATENT DOCUMENTS

| | | | |
|---|---|---|---|
| 60-21225 | 2/1985 | Japan | 264/328.7 |
| 61-177222 | 8/1986 | Japan | 264/328.7 |

*Primary Examiner*—Jill L. Heitbrink
*Attorney, Agent, or Firm*—Ostrolenk, Faber, Gerb & Soffen

[57] ABSTRACT

An improved injection molding method comprising, tightening an injection molding die with a die tightening force lower than that corresponding to a conventionally rated pressure, injecting a molten resin in a die cavity with an injection molding pressure of which intensity is determined corresponding to the die tightening force so that a gap is formed so as to permit only gas to flow outside of the die cavity via the gap, after completion of injecting temporarily interrupting injection molding so as to release a part of the injection molding pressure from the die cavity so as to maintain the reduced injection molding pressure in the die cavity in the uniformalized state, and raising the die tightening force up to a level corresponding to the rated pressure, and moreover, raising the injection molding pressure in the die cavity. Since a molten resin is injected in the die cavity with a low intensity of injection molding pressure with a low corresponding die tightening force, and moreover, the injection molding pressure is held in the die cavity in the uniformalized state before it is retained in the die cavity, a molded article having a small thickness and a large projected area can easily be produced without any occurrence of a malfunction such as warpage or the like.

1 Claim, 3 Drawing Sheets

INJECTION MOLDING METHOD

BACKGROUND OF THE INVENTION

1. Field of the Invention

The present invention relates generally to an injection molding method employable for producing a desired molded article by injecting a molten resin into a die cavity. More particularly, the present invention relates to an injection molding method of the foregoing type which assures that a molded article having a large projected area can easily be produced by applying a low intensity of injection molding pressure to the die cavity without any occurrence of a malfunction such as warpage, shrinkage or the like.

2. Background Art

When an injection molding operation is performed by employing a conventional injection molding method, a pair of die halves constituting an injection molding die are mounted on the opposing surfaces of a stationary die board and a movable die board, and subsequently, one of the die halves on the movable die board is brought in tight contact with another one of the die halves on the stationary die board so as to allow the injection molding die to be held in the tightened state. At this time, the magnitude of die tightening force is determined depending on the intensity of pressure for injecting a molten resin, and moreover, the intensity of injection molding pressure to be applied to the injection molding die is determined depending on the projected area of a die cavity (i.e., a molded article). Thus, the larger the projected area of a molded article, the higher the injection molding pressure. This causes a large magnitude of die tightening force to be required for producing a molded article having a large projected area.

Conventionally, on the assumption that two die halves of the injection molding die are brought in tight contact with each other with a die tightening force which is assumed as a rated pressure corresponding to an intensity of injection molding pressure, each injection molding operation is achieved by way of a step of injecting and filling a molten resin in a die cavity of the injection molding die by applying a high intensity of pressure to the injection molding die until the die cavity is fully filled with the molten resin while the injection molding die halves are tightening with the predetermined die tightening force and a step of retaining the injection molding pressure in the die cavity after the die cavity is filled with the molten resin not only for the purpose of preventing reverse flow of the molten resin and reduction of the injection molding pressure but also for the purpose of compensating for the shrinkage of a molded article due to cooling of the injected molten resin. The intensity of the retaining pressure to be maintained in the die cavity during the pressure retaining step varies from molded article to molded article, and there arises an occasion that multi-staged control is executed for properly controlling the retaining pressure.

When the molten resin is injected in the injection molding die by applying a high intensity of injection molding pressure to the injection molding die, an inner stress is liable to remain in the molded article, and this tendency is remarkably recognizable with an molded article having a large projected area. In view of this fact, it is recommendable that each injection molding operation is performed with a low intensity of injection molding pressure. However, when the injection molding pressure is set to be lower than that corresponding to the die tightening force, there arises a malfunction that the injection molding die is warped due to a relatively large magnitude of die tightening force, causing an exhausting gap preliminarily formed along a parting plane between both the die halves to be closed. This often leads to the result that gas is irregularly exhausted from the injection molding die as the latter is filled with the molten resin, resulting in the injection molding die failing to be uniformly filled with the molten resin.

It is also contemplatable that each injection molding operation is performed depending on the contour of a molded article under a condition that both the intensity of injection molding pressure and the magnitude of die tightening force are reduced. In this case, it becomes difficult to retain the injection molding pressure in the injection molding die after completion of the injection of a molten resin due to reduction of the intensity of injection molding pressure. If the intensity of injection molding pressure is increased for the purpose of reliably retaining the injection molding pressure in the injection molding die, the latter is undesirably opened due to the unbalanced state between the injection molding pressure and the die tightening force, resulting in the injection molding pressure failing to be retained in the injection molding die.

In the case that a molded article has a small thickness, there arises a malfunction that warpage and/or shrinkage locally occurs on the molded article when the program goes to a step of retaining the injection molding pressure in the injection molding die while the intensity of pressure remaining in the die cavity is kept still high. An occurrence of the foregoing malfunction can be prevented to some extent by modifying the design of the contour of a molded article to be produced and a gate leading to the die cavity. However, in the case of a molded article having restrictions with respect to modificative designing of the contour and the gate, no measure can be taken for preventing the foregoing malfunction from arising.

SUMMARY OF THE INVENTION

The present invention has been made in consideration of the aforementioned background.

An object of the present invention is to provide an injection molding method which assures that a molten resin can be injected in an injection molding die with a low intensity of injection molding pressure while preventing a malfunction such as warpage, shrinkage or the like from arising on a molded article.

Another object of the present invention is to provide an injection molding method which assures that a molded article having a large projected area can easily be produced.

The present invention provides an injection molding method wherein a magnitude of die tightening force usually employed for performing an injection molding operation is assumed as a rated pressure, wherein the injection molding method comprises a step of tightening an injection molding die with a certain magnitude of die tightening force lower than that corresponding to the rated pressure; a step of injecting and filling a molten resin in a die cavity of the injection molding die so as to allow the die cavity to be filled therewith with an injection molding pressure of which intensity is determined corresponding to the die tightening force in such a manner that a gap is formed along a parting plane between both die halves of the injection molding die so as to permit only gas to flow outside of the die cavity via the gap; a step of temporarily interrupting injection molding when the die cavity is filled with the molten resin so as to release a part of the injection molding pressure from the die cavity, causing the injection molding pressure to be reduced, the thus reduced injection molding pressure being maintained in the die cavity in an uniformalized state; and a step of raising the die tightening force to a level corresponding to the rated pressure, and moreover, raising the injection molding pressure which in turn is retained in the die cavity.

With the injection molding method as defined in the above-described manner, since the injection molding die is tightened with a die tightening force lower than that corresponding to the rated pressure and a molten resin is then injected in the die cavity with an injection molding pressure lower than the usually employed one so as to allow the die cavity to be filled with the molten resin, there does not arise a malfunction that the injection molding die is warped. In addition, since gas is entirely exhausted outside of the die cavity after completion of a step of injection molding, the die cavity is uniformly filled with the molten resin.

Subsequently, a part of the pressure is released from the die cavity before the step of retaining injection molding pressure, whereby the molten resin precedently filled in the die cavity on the downstream side is promotively cooled. Thus, the resin flowable range in the die cavity is narrowed. While the foregoing state is maintained, the molten resin in the resin flowable range is solidified under the reduced pressure, resulting in an amount of energy consumed at this time being reduced compared with the case that the molten resin in the wide resin flowable range is solidified in the pressure retained state. As a result, a molded article can be produced with few occurrence of a malfunction such as warpage, shrinkage or the like while a certain amount of energy is uniformly distributed over the whole area of the molded article in the die cavity.

Other objects, features and advantages of the present invention will become apparent from reading of the following description which has been made in conjunction with the accompanying drawings.

DETAILED DESCRIPTION OF THE PREFERRED EMBODIMENTS

The present invention will now be described in detail hereinafter with reference to the accompanying drawings which illustrate a preferred embodiment thereof.

Figure 1:
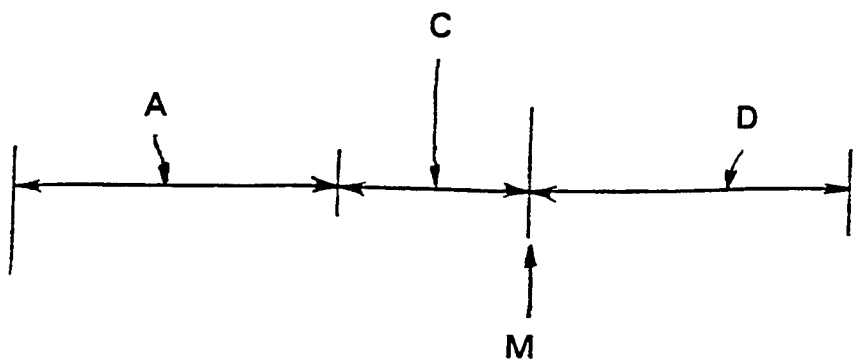
FIG. 1 is a diagram which schematically shows a series of steps to be executed for practicing an injection molding method in accordance with an embodiment of the present invention.
Figure 2:
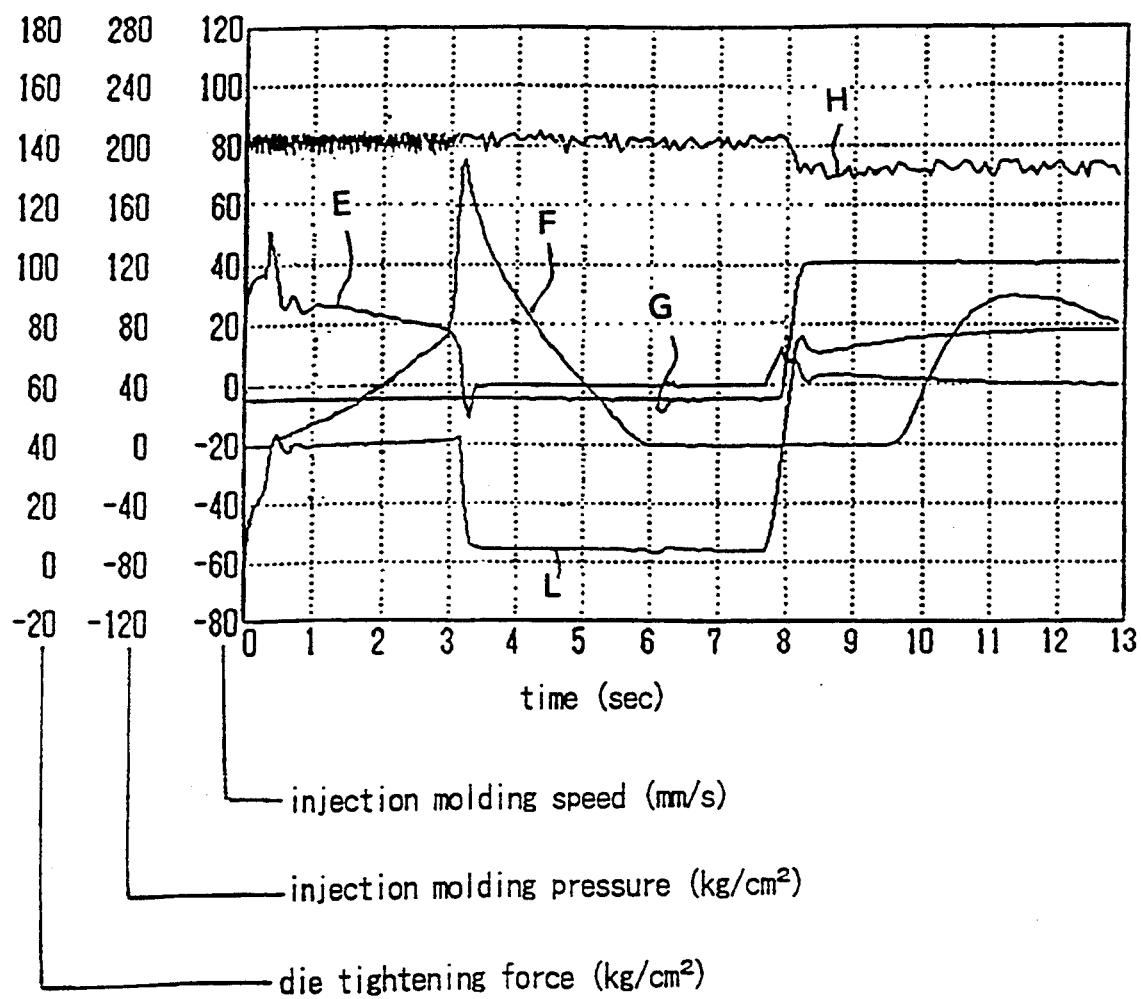
FIG. 2 shows wave shape data diagrams which represent the operative states of an injection molding machine to which the present invention is applied.
Figure 3A:
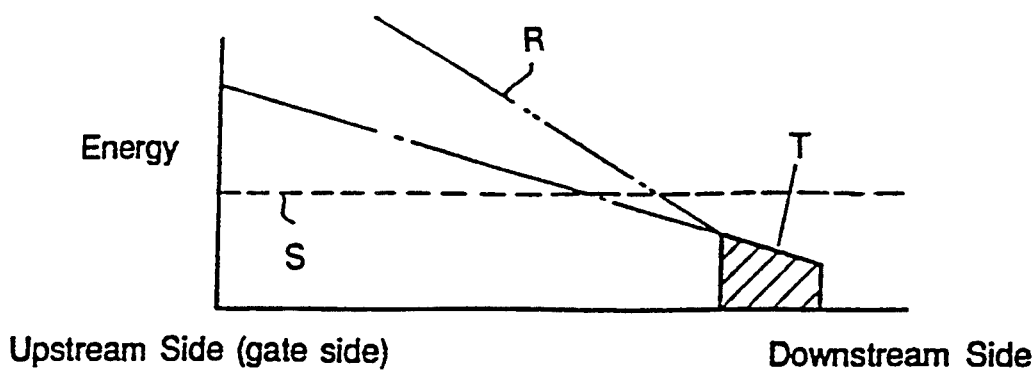
FIG. 3A to FIG. 3C are diagrams each of which shows that a certain intensity of energy is applied to an injected molten resin in a die cavity, respectively.
Figure 3B:
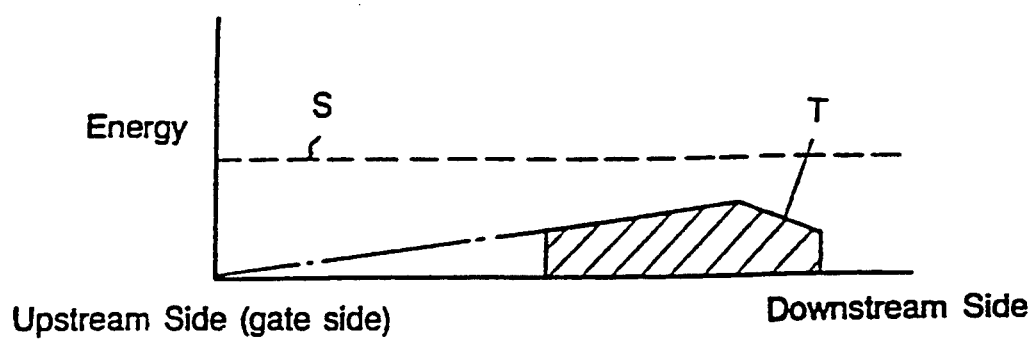
Figure 3C:
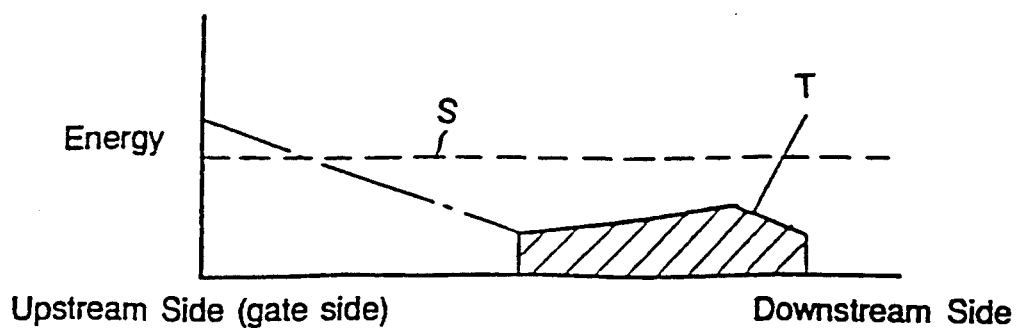

To practice an injection molding method in accordance with the present invention, there is an embodiment first, on the assumption that a die tightening force required for performing a usual injection molding operation is assumed as a rated pressure, and an injection molding die is tightened by applying a die tightening force equal to that corresponding to 30% of the rated pressure thereto. At this time, an injection molding pressure (i.e., a hydraulic pressure in an injection molding cylinder) to be applied to an injection molding die is determined in consideration of the die tightening force to assume such an intensity that a gap for allowing only gas to flow outside of the injection molding die is formed along a parting plane between both die halves of the injection molding die, and thereafter, a molten resin is injected in a die cavity of the injection molding die with the injection molding pressure determined in that way. In FIG. 1, the step of retaining the injection molding pressure is indicated as A, the range where the pressure in the die cavity is reduced (released) is shown as C and the step of filling the die cavity with molten resin is indicated as D. Point M is the position at which the die cavity is fully filled with molten resin. In FIG. 2, E represents the injection molding speed, F the pressure in the die cavity, G the die tightening force, H the die dimension and L the injection molding pressure. In FIGS. 3A through 3C, R indicates the normal retaining pressure, S the warpage occurring level and T the resin solidified range.

As shown in FIG. 2, as the molten resin is injected in the die cavity, the injection molding pressure in the injection molding die is increased, and after a time of 3.3 sec. elapses, it reaches a peak value. When the injection molding die is fully filled with the molten resin, it is slightly opened by the injection molding pressure along the parting plane by a quantity of 5/1000 to 3/100 mm, causing a gap to be formed to such an extent that the molten resin can not flow outside of the injection molding die therethrough but gas can do so. At this time, as shown in FIG. 3A, solidification of the molten resin proceeds at a flow front of the molten resin (i.e., on the downstream side) but other part of the molten resin is held in the flowable state with the exception of a portion which comes in contact with the surface of the die cavity. The energy level in the die cavity on the downstream side becomes higher than that on the upstream side where gates are formed in the injection molding die.

Figure 4:
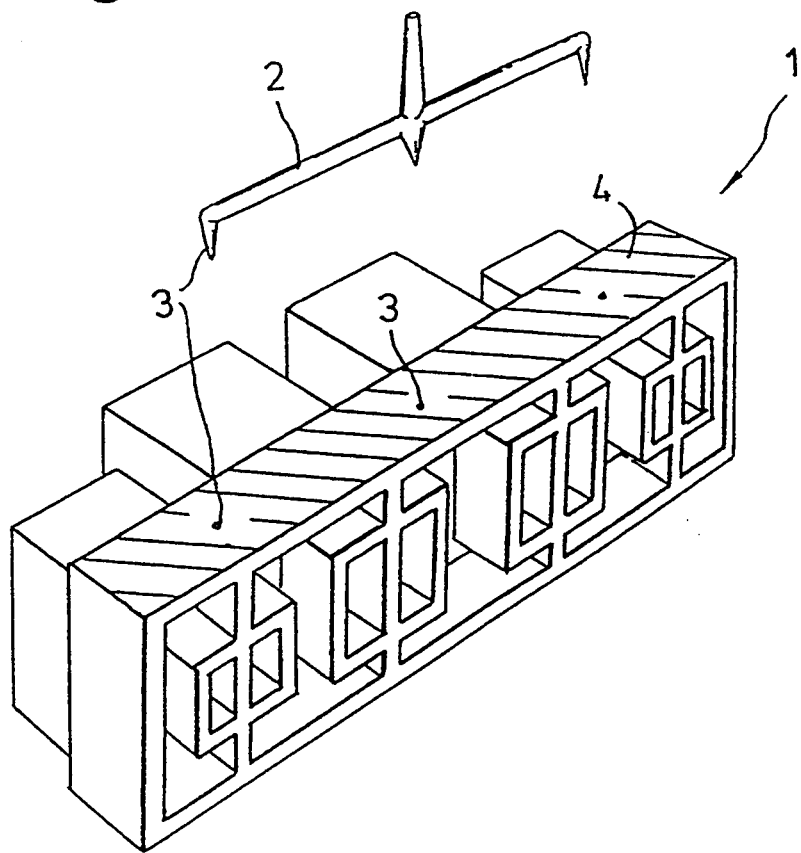
FIG. 4 is a perspective view of a molded article and a runner for which a conventional injection molding method is employed, showing that warpage arises on a plane of the molded article identified by a plurality of hatched lines.

When the program goes to a step of retaining the injection molding pressure in the die cavity while the time when the foregoing state is maintained is taken as a time when the die cavity is fully filled with the molten resin, solidification of the molten resin proceeds to the upstream side while the energy level is maintained in the well-balanced state. At this time, since the energy level largely exceeds a warpage occurrence level, the molded article is liable to warp. In the case that a molded article to be produced is a box-shaped connector 1 having a contour as shown in FIG. 4, warpage occurs on a plane of the connector 1 represented by a plurality of hatched lines. In the shown case, the foregoing plane is coincident with a thin-walled side plate portion 4 having a plurality of cavity gates 3 formed thereon which are branched from a runner 2.

When injection of a molten resin is temporarily interrupted when the pressure in the die cavity reaches a peak, the pressure in the die cavity is lowered to a zero value within the range of a period of time of 3 sec. or less. When the foregoing state is maintained for a time of about 3.3 sec., the pressure in the die cavity is uniformalized, resulting in the energy level in the flowable range of the molten resin being lowered in excess of the warpage occurrence level as shown in FIG. 3B. Thus, solidification of the molten resin on the downstream side is promoted so that the flowable range of the molten resin is narrowed further.

After the foregoing time elapses, the die tightening force is raised to a level corresponding to the rated pressure, and moreover, the injection pressure is raised so as to allow it to be retained in the die cavity, resulting in the pressure in the die cavity being raised up with a time delay of about 1.5 sec.. In a step of retaining the injection molding pressure in the die cavity, energy is applied only to the narrowed flowable range of the molten resin. In the case that the energy level is raised up in excess of the warpage occurrence level, as is apparent from FIG. 3C, the range where the energy level is raised up in that way is limited only to a small range as a whole.

Therefore, in contrast with the case that the molten resin is solidified while the injection molding pressure is retained in the die cavity in the wide flowable range of the molten resin, the amount of energy remaining in the die cavity can be reduced, resulting in energy being uniformly distributed in the whole molded article. Thus, a malfunction such as warpage, shrinkage or the like hardly occurs. The results derived from analysis of a molded article of box-shaped connector 1 produced by employing the injection molding method of the present invention reveals that appearance of a strain in the molded article can be prevented by injecting a molten resin with a low intensity of injection molding pressure, that the variation of pressure distribution in the die cavity from step to step is clearly recognized, that a value representing a shearing stress can be reduced even when a volumetric contraction rate of each molded article exhibits a same final value, and that few occurrence of a malfunction such as shrinkage or the like is recognized with each molded article.

As is apparent from the above description, according to the present invention, the injection molding method is practiced such that on the assumption that a die tightening force employed for a usual injection molding operation is assumed as a rated pressure, an injection molding die is tightened with a die tightening force lower than that corresponding to the rated pressure and a molten resin is then injected in the die cavity with an injection molding pressure of which intensity is determined in such a manner that a gap is formed so as to allow only gas to flow outside of the injection molding die along a parting plain between both die halves. Thus, in spite of the fact that the die cavity is filled with the molten resin injected with a low intensity of injection molding pressure, there does not arise a malfunction that the injection molding die is warped due to the foregoing die tightening force. In addition, since gas is uniformly exhausted from the die cavity via the gap formed along the parting plain between both the die halves, a molded article can be produced with a very small amount of remaining stress. This makes it easy to inject a molded resin in the die cavity having a large projected area.

Further, according to the present invention, the injection molding method is practiced such that after the die cavity is fully filled with the molten resin, injection of a molten resin is temporarily interrupted to release a part of the injection pressure, the pressure in the injection molding die is reduced and uniformalized, subsequently, the die tightening force is elevated to the level corresponding to the rated pressure, and thereafter, the injection pressure is raised again and then retained in the die cavity. Thus, an occurrence of warpage, shrinkage or the like on each molded article can reliably be prevented in the presence of a step of retaining the injection molding pressure in the die cavity, and moreover, a molded article having restrictions in respect of a contour and a gate design thereof can be produced without any occurrence of a malfunction such as warpage or the like.

Since any stress does not remain in each molded article because each injection molding operation is achieved with a low intensity of injection molding pressure, and moreover, any occurrence of a malfunction such as warpage, shrinkage or the like can reliably be prevented in the presence of a step of maintaining the injection molding pressure in the die cavity in the uniformalized state, not only a molded article having an ordinary configuration but also a molded article having a small thickness and a large projection area such as a compact disc or a similar information recording circular disc can be produced at a high dimensional accuracy.

While the present invention has been described above with respect to a single preferred embodiment thereof, it should of course be understood that the present invention should not be limited only to this embodiment but various change or modification may be made without any departure from the scope of the present invention as defined by the appended claims.

What is claimed is:

1. An injection molding method wherein a magnitude of die tightening force for performing an injection molding operation with the injection molding die held in the tightened state defines a rated pressure, comprising the sequential steps of:
   a step of tightening an injection molding die with a certain magnitude of die tightening force lower than that corresponding to said rated pressure,
   a step of injecting a molten resin in a die cavity of said injection molding die so as to allow said die cavity to be filled therewith with an injection molding pressure of which intensity is determined corresponding to said die tightening force in such a manner that a gap is formed along a parting plane between both die halves of said injection molding die so as to permit only gas to flow outside of said die cavity via said gap,
   a step of temporarily interrupting injection molding when said die cavity is filled with said molten resin so as to release a part of said injection molding pressure from said die cavity, causing said injection molding pressure to be reduce, the thus reduced injection molding pressure being maintained to provide a pressure in said die cavity in a uniformalized state, and
   a step of raising said die tightening force to a level corresponding to said rated pressure, and moreover, raising said injection molding pressure which in turn is retained in said die cavity.

* * * * *